(12) United States Patent
Shelnutt et al.

(10) Patent No.: US 7,785,391 B1
(45) Date of Patent: Aug. 31, 2010

(54) DENDRITIC METAL NANOSTRUCTURES

(75) Inventors: John A. Shelnutt, Tijeras, NM (US);
Yujiang Song, Albuquerque, NM (US);
Eulalia F. Pereira, Vila Nova de Gaia (PT); Craig J. Medforth, Winters, CA (US)

(73) Assignee: Sandia Corporation, Albuquerque, NM (US)

( * ) Notice: Subject to any disclaimer, the term of this patent is extended or adjusted under 35 U.S.C. 154(b) by 469 days.

(21) Appl. No.: 11/840,067

(22) Filed: Aug. 16, 2007

Related U.S. Application Data

(62) Division of application No. 10/887,535, filed on Jul. 8, 2004, now Pat. No. 7,374,599.

(51) Int. Cl.
*B22F 1/00* (2006.01)
*C22C 1/05* (2006.01)

(52) U.S. Cl. .......................... 75/255; 75/370

(58) Field of Classification Search .............. 75/255, 75/370
See application file for complete search history.

(56) References Cited

U.S. PATENT DOCUMENTS

| | | | |
|---|---|---|---|
| 6,486,602 B1 * | 11/2002 | Setzer | 313/633 |
| 6,572,673 B2 | 6/2003 | Lee et al. | |
| 6,645,444 B2 | 11/2003 | Goldstein | |
| 6,660,058 B1 | 12/2003 | Oh et al. | |

OTHER PUBLICATIONS

Zheng et al. (Journal of Crystal Growth 260 (2004) 255-262) Jan. 2, 2004.*
Daibin Kauang, Anwu Xu, Yueping Fang, Hanqin Liu, Christoph Frommen, and Dieter Fenske, "Surfactant-Assisted Growth of Novel PbS Dendritic Nanostructures via Facile Hydrothermal Process" Advanced Materials, Oct. 16, 2003, vol. 15. No. 20. pp. 1747-1750.
T.S. Ahmadi, Z.L. Wang, A. Henglein and M.A. El-Sayed, "'Cubic' Colloidal Platinum Nanoparticles", Chemistry of Materials, 1996, vol. 8, No. 6 pp. 1161-1163.
Xiuwen Zheng, Liying Zhu, Xinjun Wang, Aihui Yan and Yi Xie, "A simple mixed surfactant route for the preparation of noble metal dendrites", Journal of Crystal Growth, 260, 2004 pp. 255-262.
Masayuki Shirai, Koichi Igeta and Masahiko Arai, "Formation of platinum nanosheets between graphite layers", The Royal Society of Chemistry, 2000 pp. 623-624.
Yujiang Song, et al, "Controlled Synthesis of 2-D and 3-D Dendritic Platinum Nanostructures," Journal of American Chemical Society, 2004, 126, pp. 635-645.

* cited by examiner

*Primary Examiner*—George Wyszomierski
*Assistant Examiner*—Weiping Zhu
(74) *Attorney, Agent, or Firm*—Carol I Ashby

(57) ABSTRACT

Dendritic metal nanostructures made using a surfactant structure template, a metal salt, and electron donor species.

18 Claims, 10 Drawing Sheets

$CH_3(CH_2)_{11}SO_4Na$

SDS

$CH_3(CH_2)_{11}(OCH_2CH_2)_{23}OH$

Brij-35

SnOEP

SnUroP

DSPC

DENDRITIC METAL NANOSTRUCTURES

This application is a divisional application of the prior-filed U.S. nonprovisional patent application Ser. No. 10/887,535, filed on Jul. 8, 2004, now U.S. Pat. No. 7,374,599 and claims priority benefit therefrom. This prior-filed application is hereby incorporated by reference.

The United States Government has rights in this invention pursuant to Department of Energy Contract No. DE-AC04-94AL85000 with Sandia Corporation.

BACKGROUND OF THE INVENTION

This invention relates to metal nanostructures. Metal nanostructures are of utility in many applications, including catalysis and sensors. Many applications would benefit from nanostructures with a narrow and well-defined range of sizes and shapes of the nanoparticles.

A number of patents exist concerning metal nanoparticles.

Lee et al. (U.S. Pat. No. 6,572,673) reports a process for preparing metal nanoparticles by using anionic surfactant and suitable metal salts in the absence of adding reducing agent, such that under the reducing power of the anionic surfactant itself, the metal salts can be effectively reduced into metal nanoparticles having a uniform particle size.

Goldstein (U.S. Pat. No. 6,645,444) reports a process of reductive synthesis of a metal ion complex where the metal ion complex ligands following reaction serve to prevent agglomeration and impart solubility to the resulting metal nanocrystal. The resulting metallic nanocrystals preferably form kinetically stable solutions, in contrast to suspensions.

Oh et al. (U.S. Pat. No. 6,660,058) reports the preparation of nanoparticles of Ag and Ag alloyed with other elements such as Pt, Pd, Au, Al, Cd, and S in surfactant solutions. The surfactant molecules have the intrinsic property to adsorb into the interface which is formed between two different phases. The surfactant molecules adsorb into the surface of nuclei in solution. The adsorbed surfactant molecules from the solution prevent the coalescence of particles and control the rate of particle growth. The size of particles formed in solution can be controlled in nm scale by choosing the proper kind and/or concentration of surfactants.

Shirai et al. (Chem. Commun. (2000) p. 623-4) reports the formation of Pt nanosheets with thickness of 2-3 nm containing hexagonal holes that were formed between graphite layers by hydrogen reduction of platinum chloride-graphite intercalation compounds.

Zheng et al. (J. Crystal Growth vol. 260 (2002) p. 255-262) reports the formation of Au and Ag nanocrystals with novel dendritic structures in mixed cetyltrimethylammonium bromide and sodium dodecyl sulfate solutions. The dendrites consist of a long central backbone with projecting needles having parallel symmetry with respect to each other rather than randomly ramified secondary branches.

Kuang et al. (Adv. Mater. 15 (2003) p. 1747-1750) reports a hydrothermal process for preparing dendritic PbS in the presence of surfactant; the PbS dendrites consist of a long central backbone with projecting needles having parallel symmetry with respect to each other rather than randomly ramified secondary branches.

Ahmadi (Chem. Mater 8 (1996) p. 1161-1163) reports the formation of platinum nanoparticles with cubic shape in addition to previously reported tetrahedral, icosahedral, and cubooctahedral platinum particles. Nanodendrites are not formed by this method.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

This invention comprises a method for making dendritic metal nanostructures. Metal nanostructures are of considerable interest because of their importance in a wide range of applications including catalysis and sensors. Metal nanostructures have been synthesized in many forms, ranging from conventional metal colloids to nearly monodispersed nanoclusters, shape-controlled nanocrystals, and other nanostructures such as wires and sheets. Nanostructured platinum is of particular interest for many applications. While several platinum nanostructures have been reported, including nanoparticles, nanowires, and nanosheets, the synthesis of additional types of nanostructures is highly desirable and potentially technologically important. Therefore, new methods for the synthesis of metal nanostructures are important for providing the reproducibility and control over properties required for advanced technological applications.

This invention comprises a method of synthesis that leads to novel types of fractal shaped metal nanostructures of controlled sizes. Variations of dendritic metal nanostructures formed using the method of this invention are called nanodendrites, dendrites, nanosheets, sheets, nanofoams, foams, foam-like nanoballs, and foam-like balls herein. The nanosheets, nanofoams, and foam-like nanoballs have randomly ramified secondary branches. This synthetic method is based on a seeding and fast autocatalytic growth approach in which an aqueous solution of metal salts is reduced by an electron donor, for example, ascorbic acid, in the presence of surfactant that can provide a surfactant structure template. Embodiments of this method that employ platinum are described and illustrated herein. This seeding/autocatalytic approach produces nanodendrites, which grow by interfacially directed autocatalytic reduction of platinum onto the platinum nanoparticle seeds. Such metallic platinum nanodendrites have not been made previously by autocatalytic growth or by any similar approach. Platinum dendrites of considerably different morphology have been grown from lithium tetraborate melts by the Czochralski method. The present approach is different from the conventional growth of dendrites by diffusion-limited crystallization of metals or by the Czochralski method.

Figure 2:
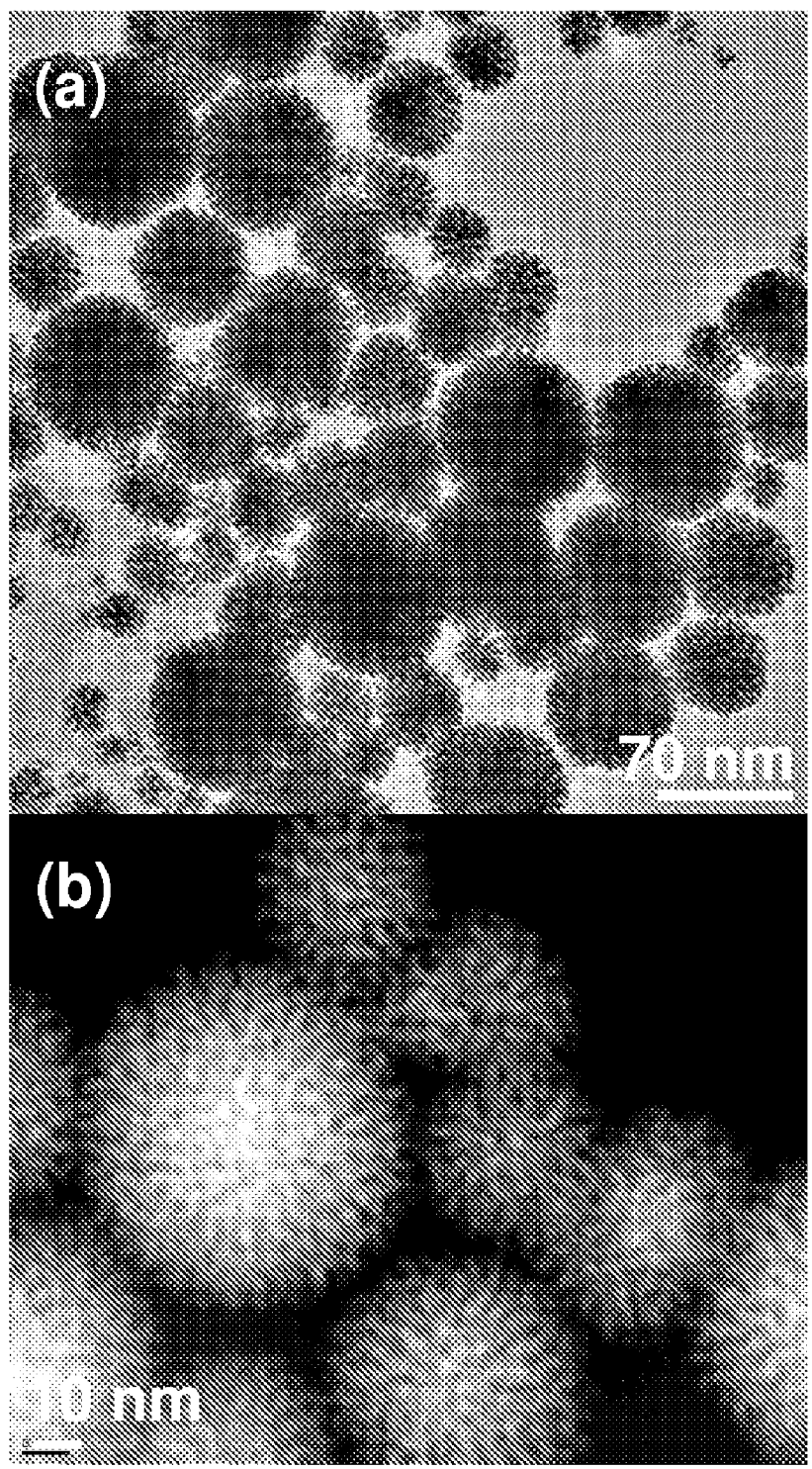
FIG. 2 shows micrographs of the structure of dendritic metal nanospheroids. a) transmission electron micrograph (TEM) image of nanodendrites produced with Brij-35 surfactant in the absence of photocatalyst. (b) high-angle annular dark field (HAADF) scanning TEM image of the three-dimensional platinum dendrites grown in the presence of Brij-35 micelles without photocatalyst.
Figure 3:
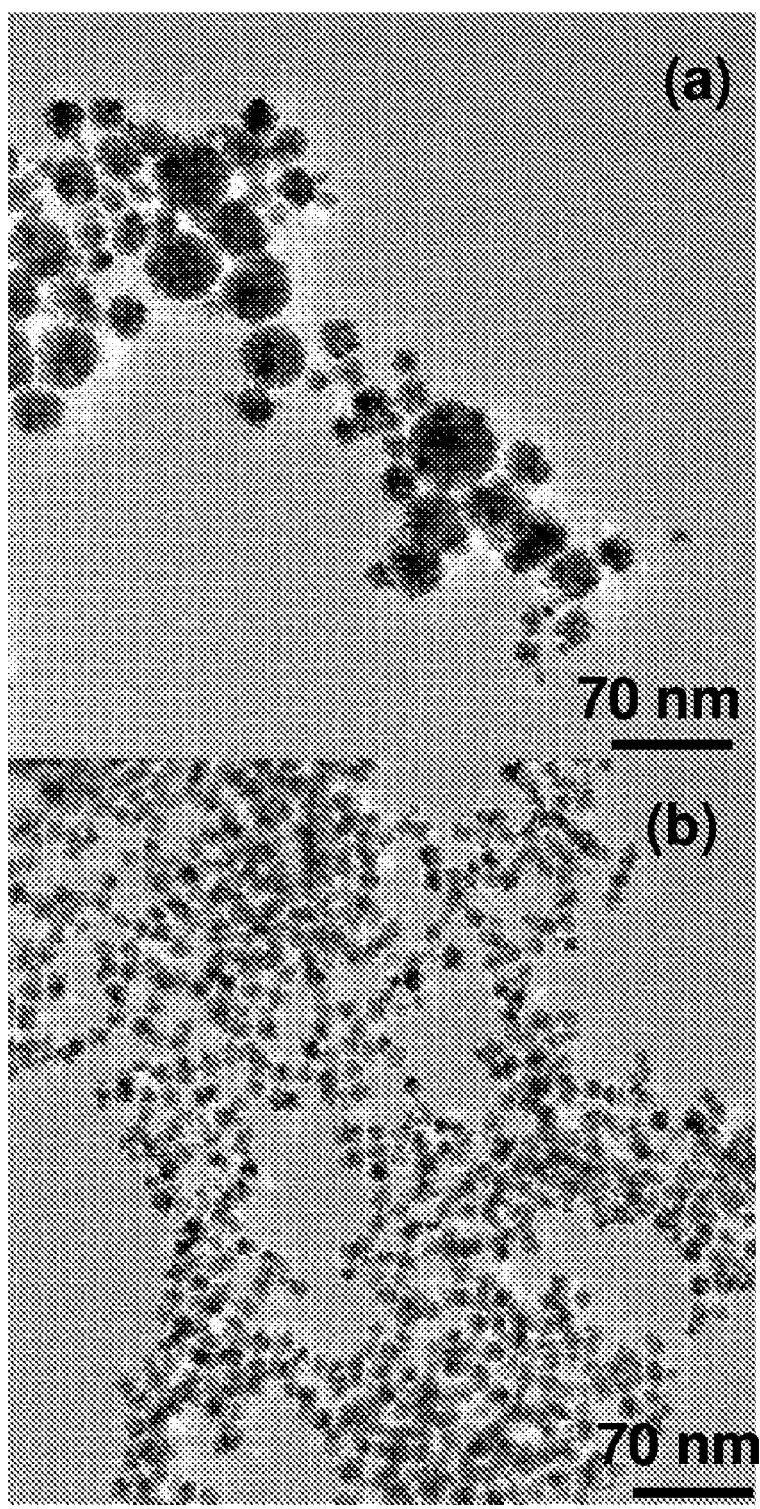
FIG. 3 TEM images of platinum nanostructures produced in the presence of SDS without (a) and with (b) photocatalyst.
Figure 4:
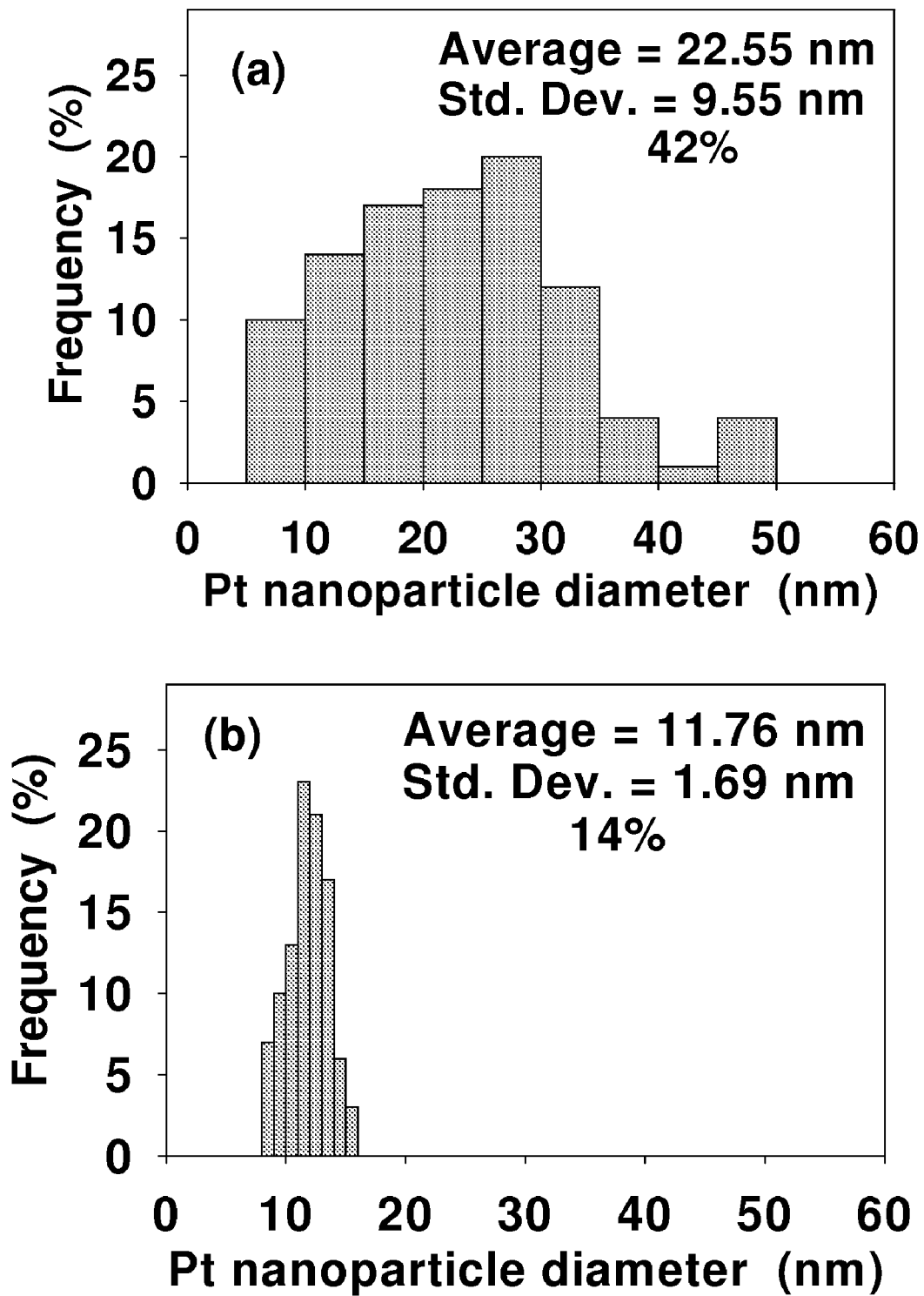
FIG. 4 illustrates the respective size distributions of the nanostructures in FIGS. 3a and 3b. Average diameters were measured for 100 nanostructures and their frequencies are plotted.
Figure 5:
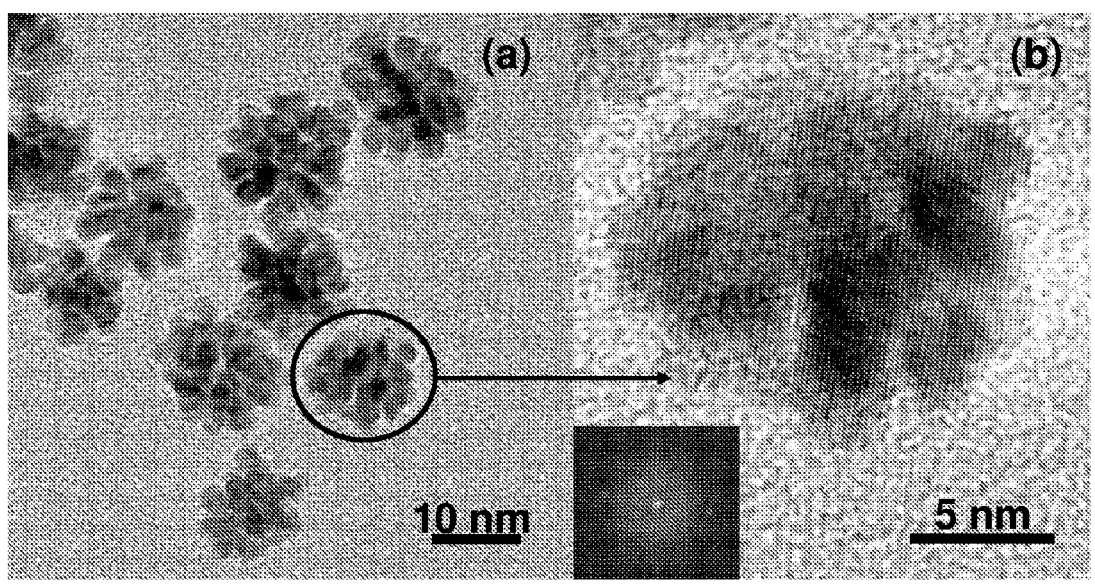
FIG. 5 (a) TEM image of spheroidal nanodendrites produced using fast photocatlytic seeding by SnOEP and subsequent autocatalytic reduction of $Pt^{2+}$ complexes by the seed particles. (b) High resolution TEM of single nanodendrite shows single-crystal character.
Figure 6:
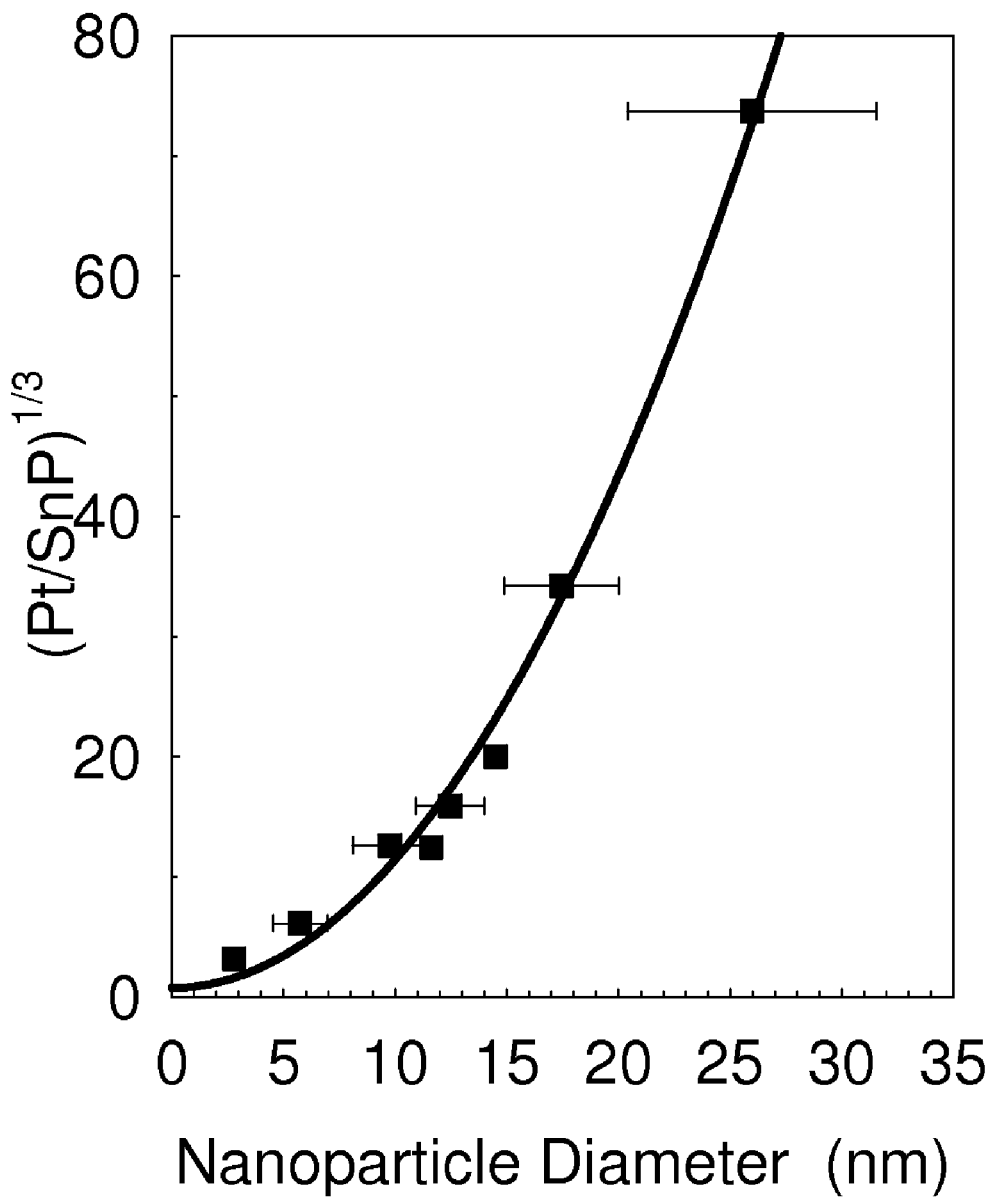
FIG. 6 illustrates the relationship of the cube root of the Pt-to-porphyrin molar ratio (nanoparticle volume per nucleation center) to the nanoparticle diameter.
Figure 7:
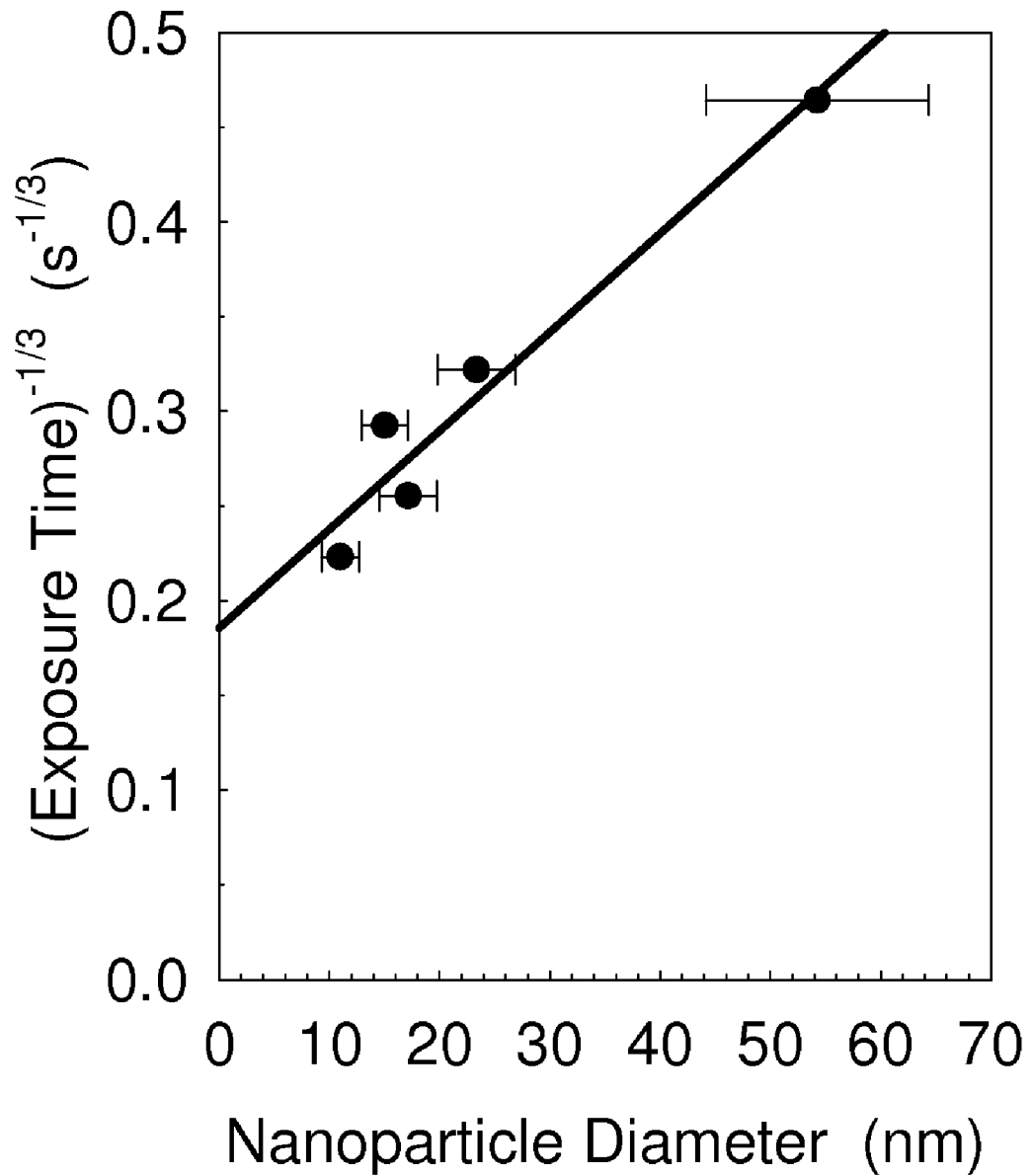
FIG. 7 illustrates the relationship of the irradiation time to the nanoparticle diameter.
Figure 8:
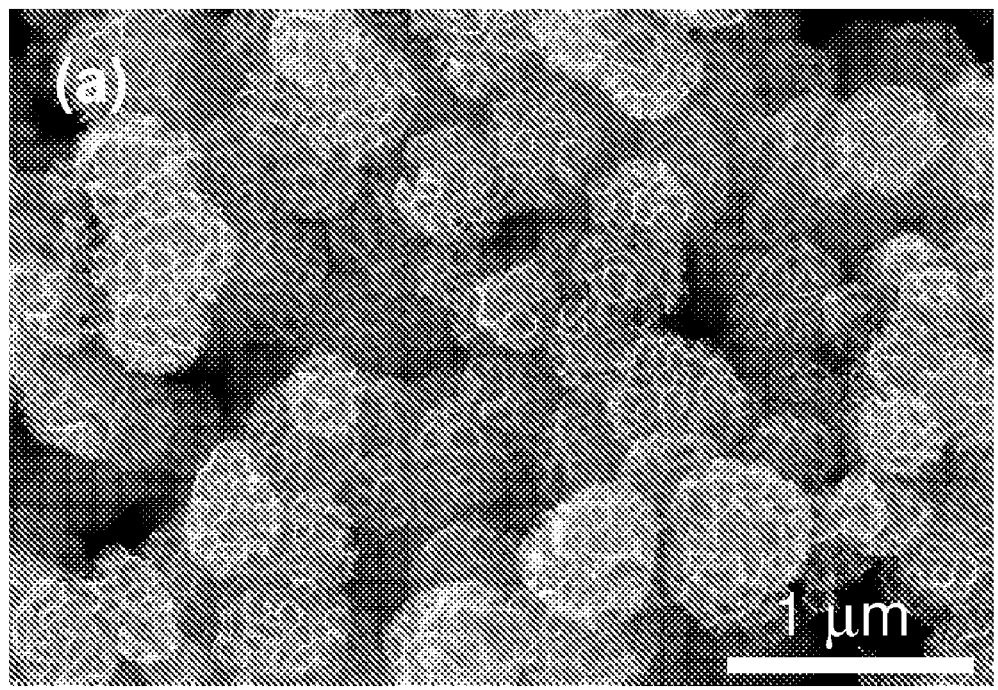
FIG. 8 Scanning electron micrograph (SEM) images of foam-like balls (a) and foams (b) composed of aggregated platinum dendritic nanosheets prepared with 120 nm unilamellar liposomes containing SnOEP under tungsten light irradiation for 10 seconds and 5 minutes, respectively.
Figure 8:
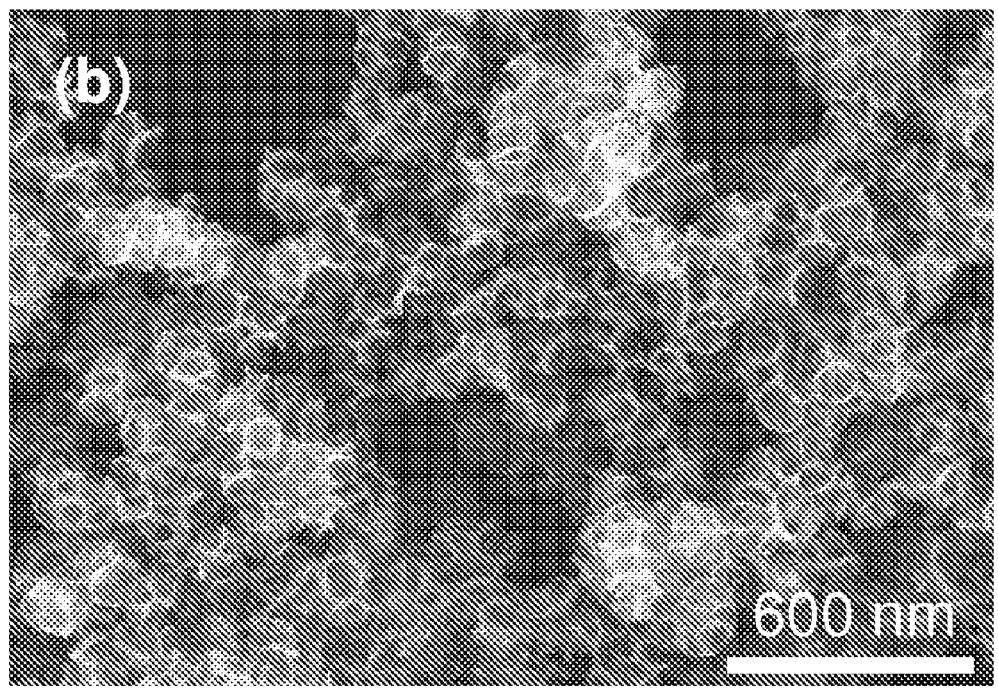
Figure 9:
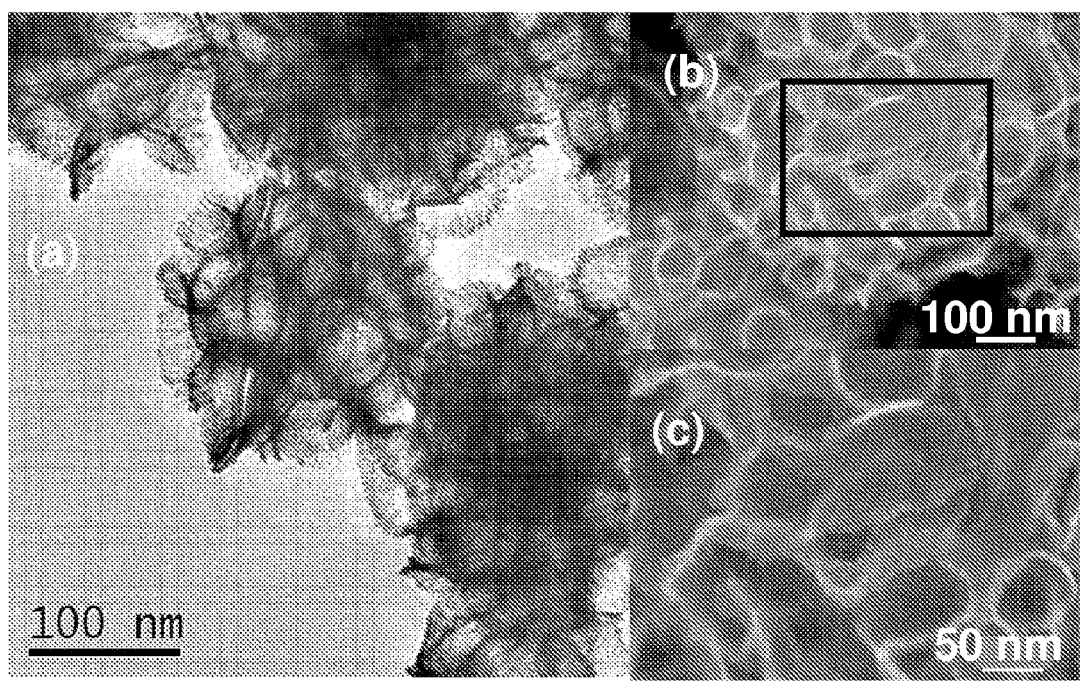
FIG. 9. Higher magnification TEM image (a) and SEM images (b) and (c) of foam-like balls composed of aggregated platinum dendritic nanosheets. (c) is an enlargement of the square region in (b).

In some embodiments involving micellar solutions, the new synthesis yields three-dimensional metallic platinum nanodendrites, or dendritic metal nanospheroids, of diameters ranging from 6 to 200 nm. In embodiments where large liposomes are used, dendritic disk-like nanosheets or dendritic sheets in the form of solid foam-like nanomaterials are produced depending on the experimental conditions, indicating a templating effect of the surfactant assembly. Control over the size of these dendritic nanostructures is conveniently realized by using a photocatalyst, for example, a tin-porphyrin photocatalyst, to rapidly generate an initial population of growth centers, also called seed nanostructures herein. In the case of the three-dimensional nanodendrites, this photocatalytic seeding approach can be used to produce nanostructures with average sizes in the range of 10 to 50 nm and narrow size distributions. These are illustrated in FIGS. 2, 3 and 5. Size distributions of nanoparticles produced by a single reaction run using this method with and without photocatalytic seeding are illustrated in FIG. 4. Variation of the intensity and duration of light exposure and the photocatalyst concentration provides control of the size of the nanodendrites. This is illustrated in FIGS. 6 and 7. The small three-dimensional platinum nanodendrites obtained by the photocatalytic synthetic method are functional catalytic/photocatalytic units capable of $H_2$ evolution from water.

Figure 1:
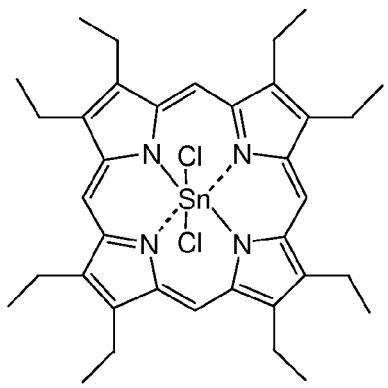
FIG. 1 illustrates the structure of some of the surfactants and porphyrins described herein.
Figure 1:
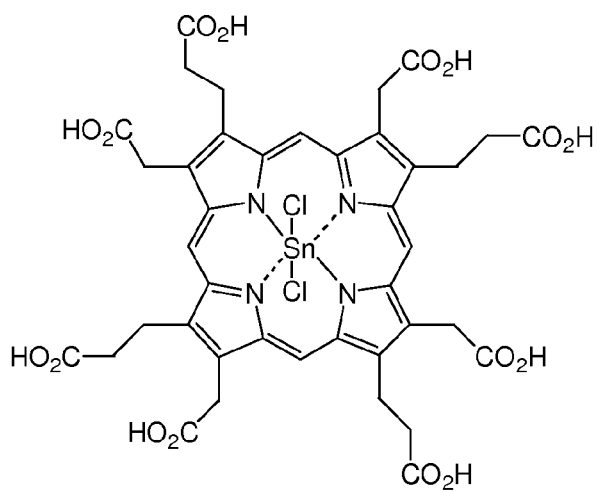
Figure 1:
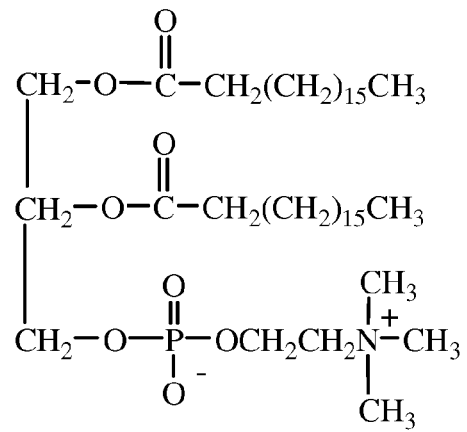

In several of the embodiments described herein, the following materials were employed: Potassium tetrachloroplatinate (II) ($K_2PtCl_4$), L-ascorbic acid, sodium dodecylsulfate (SDS), polyoxyethylene (23) lauryl ether (Brij-35), 1,2-dioctadecanoyl-sn-glycero-3-phosphocholine (DSPC), cholesterol, Sn(IV) octaethylporphyrin dichloride (SnOEP), and Sn(IV) uroporphyrin I (SnUroP), and Sn tetra(N-methylpyridinium)porphyrin (SnT(N-Me-Py)P. The chemical structure of some surfactants and some metalloporphyrins are shown in FIG. 1.

In several embodiments, platinum (II) solutions were prepared by dissolving $K_2PtCl_4$ in water at room temperature and were sometimes aged at least 24 hours before use. Aging the platinum solution disproportionates the complex into an equilibrium mixture of 42% $Pt(H_2O)_2Cl_2$, 53% $Pt(H_2O)Cl_3^-$, and 5% $PtCl_4^{2-}$. SDS (80 mM) or Brij-35 (1 mM) micellar stock solutions were prepared by dissolving SDS or Brij-35 in water with mild sonication. Dissolution without sonication is also possible. Porphyrin-saturated surfactant solutions were prepared by dissolving SnOEP in these SDS or Brij-35 solutions using mild sonication. Dissolution without sonication is also possible. Undissolved suspended SnOEP was filtered off using a 200-nm-pore filter and this porphyrin stock solution (10 to 175 μM in SnOEP and 80 mM in SDS or 1 mM in Brij-35) was diluted to the desired concentration for use in the reaction. Solutions of other metalloporphyrins, such as tin (IV) T(N-Me-Py)P, are prepared in a similar manner. The ascorbic acid solution was freshly prepared because of its gradual oxidation in air; the oxidation is evidenced by the decrease in the ascorbic acid UV absorption bands.

In several embodiments, multilamellar vesicles of different sizes were prepared by sonication of an 8-mM DSPC aqueous solution containing ascorbic acid (150 mM). Unilamellar liposomes with a composition of 1:1 DSPC:cholesterol mole ratio were prepared by an extrusion procedure. Stock solutions typically at a concentration of 10 mg/mL of lipids were prepared in 9:1 chloroform:methanol (v/v). Mixtures of various lipids amounting to 10 μmole total were added to a round-bottomed flask. The flask was connected to a rotary evaporator and dried at 60° C. for 1.5 hours to form a thin lipid film on the inside wall of the flask. The dried lipid layer was then hydrated in 3 mL of filtered and degassed water or aqueous 150-mM ascorbic acid for one hour at 65° C. to form multilamellar liposomes. The multilamellar liposomes were sonicated briefly in a bath sonicator to reduce the average size of liposomes and then extruded through a 300-nm-pore polycarbonate membrane in a pneumatic liposome extruder. Liposomes were extruded 31 times to ensure uniform size distribution. The resulting unilamellar liposome suspension was centrifuged for 20 minutes at 3000 g to remove residual multilamellar liposomes and aggregated lipids. Liposome solutions in water and in aqueous ascorbic acid were prepared both with and without 333-nM SnOEP.

The hydrodynamic diameters obtained for the unilamellar liposomes from dynamic light scattering measurements were 161.6 nm for the porphyrin-containing liposomes and 175.1 nm for the control porphyrin-free liposomes. Zeta potentials of the liposome solutions were measured by electrophoretic light scattering. Liposomes were diluted in a 10-mM KCl solution for the measurement of the zeta potentials; the zeta potential was −1.55±0.65 mV. The size of the multilamellar DSPC vesicles in solutions was determined by dynamic light scattering measurements. Average vesicle diameters produced ranged from 57 to 400 nm depending on the sonication times.

In an embodiment using micellar soutions, 0.125 mL of the aqueous stock solution containing SDS (80 mM) or Brij-35 (1.0 mM) micelles was added to a glass reaction vessel. To this solution, SnOEP was added to the desired concentration (0 to 35 μM) by making microliter-scale additions from the porphyrin-surfactant stock solutions. Then, 0.25 mL of the Pt salt solution (20 mM) and 0.25 mL of an ascorbic acid solution (150 mM; containing the surfactant at the same concentrations given above) were added stepwise to the reaction vessel. The pH of this reaction solution was 3.0. The reaction vessel containing the solution was irradiated with incandescent light (up to 800 nmol-$cm^{-2}$-$s^{-1}$) for 30 minutes. The light intensities range from ambient room light (0.5-2.0 nmol-$cm^{-2}$-$s^{-1}$) to intense incandescent irradiation from a projector (800 nmol-$cm^{-2}$-$s^{-1}$). At the highest intensities, some heating from the light source occurred, but controlled temperature studies showed that the heating did not primarily control the platinum nanostructure product. The color of the reaction solution changed within 10 minutes from transparent light brownish-yellow (from the Pt complex) to brownish-gray to opaque black.

In an embodiment that forms liposome-templated nanostructures, similar volumes of the aqueous solutions containing DSPC/cholesterol liposomes, Pt complexes (8 mM), and ascorbic acid (60 mM) were mixed to form a reaction solution and irradiated with incandescent light for 30 minutes. For some of the solutions the DSPC liposomes also contained SnOEP. The reaction solution turned black during irradiation at a slower rate than in the case of the micellar reactions, with the reaction rate depending on the intensity of irradiation and size of the surfactant assembly.

Transmission electron microscopy (TEM) at 200 keV, high-resolution TEM (HRTEM), high-angle annular dark-field (HAADF) scanning TEM at 200 kV, selected-area electron diffraction, and energy-dispersive X-ray spectroscopy were employed to characterize the nanostructures. The samples for TEM analysis were prepared by adding drops of colloidal solutions onto standard holey carbon-coated copper grids. The excess solvent was wicked away with a filter paper, and the grids were dried in air. SEM images were also obtained for some of the nanostructures. FIGS. 2, 3, 5, 8, and 9 illustrate some of the nanostructrures that have been made using this invention. Dynamic light scattering measurements were also used to determine the size of the platinum nanostructures in solutions.

In the absence of surfactant, the reduction of platinum salts by ascorbic acid occurs in minutes and results in macroscopic pieces of platinum metal that settle out within ten minutes. However, reduction in the presence of large unilamellar liposomes has a dramatic effect on the morphology of the platinum obtained from the reaction. When 160-nm diameter unilamellar distearoyl-phosphatidylcholine (DSPC) liposomes are used in the reaction, substantially two-dimensional substantially circular metal nanosheets result. The thickness of the interior portion of the nanosheets can be estimated from the platinum thickness at the particle-like tips of the circular nanosheets (~3 nm), suggesting the sheets are approximately 2-nm thick. Such thin sheets with thicknesses less than 10 nm are referred to hereafter as "two-dimensional" nanosheets or nanostructures. For these two-dimensional nanostructures, the vertical thickness does not vary proportionately with the lateral dimension of the dendritic nanostructure. These are also referred to herein as dendritic metal nanosheets.

Scanning TEM using a high-angle annular dark-field (HAADF) detector allows one to image nanostructures as small as single atoms using the electrons scattered to high angle. HAADF can provide the z-density projection of the nanostructures for profile imaging. Density profiles obtained from the scanning TEM HAADF images show that the arms of the dendrites generally have a uniform thickness, except at the tips. The platinum nanosheets are obtained in varying diameters, but an ensemble of dendritic metal nanosheets of more uniform diameter can be obtained by initially seeding the reaction with 3-nm platinum particles or by in situ photocatalytic generation of Pt seed particles.

These thin nanosheets are unmistakably dendritic. The fractal dimensions of these nanosheets were obtained by analysis of the TEM images of several two-dimensional dendritic nanosheets. The average fractal dimension is 1.73±0.08 when analyzed using the box-counting method with the box size varied over two decades. This value of the fractal dimension is typical of computer simulations of two-dimensional aggregation when only single particles are allowed to diffuse by Brownian motion (1.7) and considerably different from cases in which particle clusters can diffuse (1.4) or particle motion is linear. In the present case, metal atoms are not the diffusing species, but a similar diffusion-limited process occurs in which ascorbic acid and Pt complex diffuse to the surface of the growing metal dendrite and react. The circular nanosheets are templated by the liposomal surface, possibly on the surface or within the bilayer. Alternatively, the nanosheet starts to grow on a liposome, then sticks to another liposome and continues to grow at the interface between the two liposomes. In this case, reactants would be available for growth only by diffusion into the interfacial region between the two liposomes and thus reactants would be preferentially available to the tips of the dendrite.

Large (~100-500 nm) multilamellar vesicles of DSPC also serve as templates for producing the Pt nanosheets. Changing the size of these vesicles at a constant DSPC concentration by sonication alters the morphology of the platinum nanostructure obtained from the subsequent reaction. For example, with small vesicles (57 nm) prepared by intense sonication of the large multilayer vesicles, the reaction gives nanoparticle groupings and only a few small poorly formed dendritic nanosheets. This result suggests that it is the curvature of the surfactant assembly that determines the dimensionality of the dendrites. Apparently, the surface curvature of the small vesicles is too great to support Pt growth in sheets, consistent with a templating role for the large liposomes as discussed in more detail below.

The detailed structure of the circular nanosheets is revealed by high resolution TEM images and electron diffraction. Metal growth occurs in essentially the same crystallographic orientation throughout the dendrite. Crystal bending can be seen directly in the lattice fringing of high resolution images, thus crystal bending and an occasional low-angle grain boundary account for the elongated points of the electron diffraction pattern from such nanostructures. The directions of the crystallographic axes appear to vary by up to 10°, based on the elongation of the points in the diffraction pattern.

The two-dimensional platinum nanostructures take on a different form when they are prepared using liposomes prepared under different conditions. When the liposomes are prepared in water and then added to an ascorbic acid solution (60 mM) for the platinum reduction reaction, the platinum produced appears as balls of dendritic nanosheets (FIGS. 8(a) and 9), also called foam-like nanoballs, or as nanofoams. The nanofoams, also called dendritic metal nanofoams, are foam-like materials illustrated in the TEM and SEM images of FIG. 8(b). These porous aggregations of nanosheets are not observed when the liposomes are prepared in ascorbic acid; instead the reaction gives mostly the circular nanosheets. For the liposomes prepared in water, differences in chemical potential between the water on the inside of the liposome and the solution of ascorbic acid and Pt salt on the outside of the liposome appears to disrupt the normal liposomal structure and cause aggregation, giving rise to the nanofoams and foam-like nanoballs.

Dendritic platinum or palladium nanosheets are templated onto unilamellar liposomes, leading to porous foam-like metal nanostructures and nanomaterials. Porosity is varied by controlling the liposomal diameter and space between the arms of the dendrites. The nanofoam's structure is further controlled by photocatalytic initiation of growth centers in the lipid bilayer. Light intensity, exposure time, and the concentrations of the metalloporphyrin photocatalyst and the Pt or Pd ion alter the metal nanostructure. The following description is presented in terms of Pt but applies to other metals as well.

The foam-like balls are three-dimensional and have pore sizes characteristic of the templating liposomes. The metal appears to grow in sheets at the interfaces between aggregated liposomes to generate the foams. The Pt sheets making up the walls of the foam structure are similar to the 2-nm-thick nanosheets of the two-dimensional nanodentrides. The nearly uniform size of the foam nanoballs in FIG. 8(a) is a consequence of the nearly equal growth times after rapid photocatalytic formation of catalytic nanoparticle seeds, from which the Pt nanosheets grow autocatalytically. By varying the factors listed above, a higher initial seed population can be generated so that the nanoballs join to form monolithic Pt foams or a lower initial population of seeds to form nanoballs. By varying the light exposure time at a constant Pt/Sn-porphyrin concentration ratio and at constant light intensity, different nanostructures can be obtained. Large foam balls can be obtained using short exposure times (small initial seed population.) With intermediate exposure times, the nanoballs are smaller and of more uniform size. For longer exposure times producing the highest seed populations, approximately circular dendritic nanosheets are formed.

The size of the large pores in the nanofoams is determined by the size of the liposomes upon which the Pt dendritic nanosheets grow. A smaller scale porosity is determined by the 1-2 nm gaps between the arms of the dendritic nanosheets. Similar foam-like structures are obtained using Pd salts instead of Pt salts.

The platinum nanostructures obtained in the presence of small surfactant assemblies were further examined using SDS and Brij-35 micelles. The product obtained has an entirely different morphology (see FIGS. 2, 3 and 5) than the nanosheets obtained with the larger liposomes. Bright-field TEM images of the reduction product reveal platinum nanostructures that are dendritic but which are now three-dimensional and spheroidal. The dendritic nature of the nanostructures is quite evident in the high angle annular dark field (HAADF) scanning TEM images (FIG. 2(b)).

It is a common goal in the synthesis of metal nanostructures for the synthesis to yield nanostructures of a specific size and narrow size distribution and that the synthesis produce a highly reproducible product. A mechanism based on seeding (controlled nucleation of nanoparticle growth centers or seeds) and fast autocatalytic growth is proposed to explain the formation of the dendritic metal nanostructure made by the method of this invention. The following describes the mechanism using Pt as an exemplary metal with ascorbic acid (AA) as an exemplary electron donor.

In the seeding/autocatalytic growth mechanism without photocatalysis, slow chemical reduction of Pt ions by ascorbic acid occurs to give Pt-nanoparticle growth centers (seeds) at very low concentration by the simplified redox reaction:

$$Pt^{2+}+AA \rightarrow Pt^0+AA_{ox}$$

When these seeds reach a certain size (~500 atoms), the Pt nanoparticles are believed to become autocatalytic for the platinum reduction reaction. The seed particles then rapidly grow into the mature nanostructures as the autocatalytic reduction uses up the available platinum complex.

For the nanostructures shown in FIG. 2, the slow, continuous formation of seed nanoparticles over the entire reaction time leads to a large average size for the nanostructures and a broad size distribution. This is due to the variation in the autocatalytic growth period for seed particles that were initially formed at different times during the process. Smaller and more uniform three-dimensional nanostructures are obtained if the micellar reaction solution is initially seeded with ~3-nm Pt nanoparticles; these seeds have equal autocatalytic growth times and thus yield small uniform sized nanostructures. So, although the autocatalytic growth is uncontrolled, the size and size distribution of the nanostructures can be controlled by various seeding strategies.

A highly controllable method for producing a large initial concentration of seeds for controlling the size and uniformity of the nanostructures is to use a photocatalyst and light to rapidly generate the seed nanoparticles in situ. This method provides a broad range of possible seed concentrations and rates of formation allowing precise control over the size of the nanostructures. Another potential advantage of the photocatalytic seeding method is that the seed particles, and thus the platinum nanostructure, may be placed at a desired location by pre-positioning the photocatalyst molecules. In the present example, a hydrophobic photocatalyst molecule is positioned within the interior of a micelle or within the bilayer of a liposome and is used to initiate seed and thus nanostructure growth.

One type of photocatalyst that may be chosen to generate seeds is a tin(IV)-porphyrin complex (SnP), two examples of which are shown in FIG. 1. A variety of photocatalyts can be used for this step as long as the photocatalyst possesses a photoexcited state that can be reduced by the electron donor species to form a species that can reduce an ion of the metal that is forming the dendritic metal nanostructure to the zerovalent state. The photocatalytic reduction of platinum salts by the SnP is accomplished in the presence of light and an electron donor species (ED), ascorbic acid in this case. The useful wavelengths of light are determined by the optical excitation characteristics of the chosen metalloporphyrin. For the SnP employed in this embodiment, visible light works well. The SnP photoreaction is a reductive photocatalytic cycle. In the present photoreaction, $Pt^{2+}$ is reduced as described by the following simplified equations:

$$SnP+h\nu \rightarrow SnP^*$$

$$SnP^*+ED \rightarrow SnP^{-\bullet}+ED_{ox}$$

$$2SnP^{-\bullet}+Pt^{2+} \rightarrow 2SnP+Pt^0$$

Absorption of visible or UV light by the SnP yields the long-lived excited triplet $\pi$-$\pi^*$ state, SnP*, which is rapidly reduced (SnP*/SnP$^{-\bullet}$, +1.1 V, calculated by adding the triplet state energy to the potential for SnP/SnP$^{-\bullet}$) by an ED such as ascorbic acid. The product is a long-lived radical anion, SnP$^{-\bullet}$, which is a strong reductant (SnP/SnP$^{-\bullet}$, −0.66 V) capable of efficiently reducing a variety of metal ions including Ag, Au, Hg, Pb, Cu, and Pt to the zero-valent metals. Reduction of the metal regenerates neutral SnP, which again becomes available to absorb light and initiate a successive photochemical cycle. The photocycle is reductive because the initial electron-transfer event is the reduction of the porphyrin by the ED.

In an embodiment employing the photocatalytic seeding method, hydrophobic SnOEP was included in an SDS micellar reaction mixture in catalytic amounts (~1 μM). Although SnOEP is very slightly soluble in water without surfactant, its solubility is much greater in surfactant solutions, indicating that the SnOEP molecules are associated with surfactant assemblies. After exposure to intense incandescent light (0.8 μmol-cm$^{-2}$-s$^{-1}$) for several minutes, the reaction solution turned black after approximately the same length of time as was observed in the absence of the photocatalyst. However, compared to the nanostructures obtained in the absence of photocatalyst (FIG. 3(a)), the product of the photocatalyzed process consisted of small strikingly uniform Pt nanostructures (FIG. 3(b)). The photocatalytic property of the porphyrin causes the size change rather than the presence of the porphyrin molecule. Another tin porphyrin, SnT(N-Me-Py)P, had the same effect on nanostructure size as SnOEP. Other phtochemically active complexes can be used. Some examples include metalloporphyrins, metallochlorins, metallochlorophylls, metal polypyroles, metal polypyridines, and metal phenanthrolines. Included by definition in these terms are their related analogs wherein substituent moieties are added to the foundational heterocycle. Hence, these terms include their derivitized analogous forms.

The nanostructures generated in the photocatalytically seeded reaction are spheroidal or approximately spherical in shape. Measurements of the nanostructures in the TEM images give an average diameter of 11.8±1.7 nm. Although they appear to consist of joined nanoparticles with particle diameters of 2.9±0.1 nm, a size typical of the particles found in Pt colloids, they are better viewed as nacent or 'embryonic' dendrites since TEM shows them to be essentially single-crystalline particles. Additional growth of these nascent dendrites (FIG. 4(b)) produces larger nanostructures of tens or hundreds of nanometers in diameter.

FIGS. 4(a) and 4(b) show the respective size distributions obtained from the TEM images of FIG. 3. These show that photocatalytic seeding results in a smaller size and a more uniform size distribution than reaction under the same conditions but without photocatalytic seeding. Specifically, when photocatalyst is absent the standard deviation is 42% of the average size (22.6 nm), indicating a lack of uniform size control (FIGS. 3(a) and 4(a)). When photocatalyst is present (FIGS. 3(b) and 4(b)), the average size is small (11.8 nm) and the standard deviation is only 14% of the average diameter, indicating greater uniformity. Dynamic light scattering confirms that the size difference apparent in the TEM samples in FIG. 3 is also present in solution. The diameters measured by light scattering are 14 nm in the presence of photocatalyst and 62 nm in the absence of photocatalyst. The larger sizes found by light scattering may results from some aggregation of the nanostructures in solution.

The average nanostructure size can be controlled by varying the amount of available platinum per initial seed nanoparticle. That is, the autocatalytic reduction will distribute the Pt atoms more or less equally onto the seed nanoparticles formed by fast photocatalytic reduction at the beginning of the reaction. One convenient way to vary the concentration of seed nanoparticles is to vary the metalloporphyrin concentration; more metalloporphyrins make more seed nanoparticles and consequently smaller dendritic nanoparticles (nanodendrites) form at a fixed platinum concentration. FIG. 6 shows that the average nanostructure diameter decreases with increasing metalloporphyrin concentration and thus increasing seed concentration when the total platinum concentration is held constant. Thus, the factor determining the nanodendrite size in this case is the platinum-to-metalloporphyrin molar ratio. The diameter of the nanodendrites should be related to the cube root of the volume of platinum available for each seed nanoparticle (assuming a spheroidal structure), which in turn is related to the cube root of the Pt-to-metalloporphyrin molar ratio as shown in FIG. 6.

Although a strictly linear relationship is not observed, a direct relationship between the two quantities is clearly present. A straight line is expected in FIG. 6 only if the concentration of seeds is directly related to the metalloporphyrin concentration, the principal variable in the data for the plot. Ideally, each metalloporphyrin makes only one seed nanoparticle. Each seed nanoparticle then becomes catalytic and consumes its proportionate share of the Pt ions as it grows autocatalytically into the mature nanostructure. The curvature at high SnP concentrations (low ratios) seen in FIG. 6 probably results from light-shielding effects, which prevent some metalloporphyrins from getting enough light to generate a seed nanoparticle particle, thus raising the average nanostructure diameter per metalloporphyrin. For the smallest Pt/SnP ratio, individual 3-nm nanoparticles are obtained (first data point in FIG. 6). Deviation from linearity in the plot at high ratios is due to competition from the introduction of additional seed nanoparticles due to the slower seeding resulting from the uncatalyzed chemical reduction. The formation of these seed nanoparticles at times later than those formed photocatalytically produces smaller final nanoparticles and lowers the average diameter. The horizontal bars for several of the data points give the standard deviation of the size distribution; the distribution is seen to broaden for low SnP concentrations (large Pt/SnP ratios) because continuous spontaneous (non-photocatalyzed) seed generation provides some of the seed nanoparticles over a range of times during the total process. Note that the graph includes some data points that come from different initial Pt concentrations but the same Pt/porphyrin concentration ratios, showing that the Pt per seed nanoparticle is predominantly important in determining the final dendritic nanoparticle size.

For the experiments described in FIG. 3, the irradiation with intense light continues until the reaction is complete (30 minutes). However, the photocatalytically generated seed nanoparticles are produced during the first few minutes because the reaction mixture turns black after this time due to the formation of a high density of metal particles. During this window of opportunity for photocatalysis, it is possible to vary the irradiation time to control the number of seed nanoparticles and thus the size of the final nanostructure obtained (FIG. 7). In these experiments, portions of the same starting reaction solution are used and intense light exposure (800 nmol-cm$^{-2}$-s$^{-1}$) for the specified times is followed by exposure to ambient room light (0.5-2.0 nmol-cm$^{-2}$-s$^{-1}$) until the reaction is complete at 30 minutes total time. FIG. 7 shows that increasing the initial exposure time from 10 s to 90 s gives nanostructures with proportionally smaller diameters and narrower size distributions, which is consistent with a photocatalytic seeding mechanism. Given that the SnP concentration is the same for all the experiments, the number of seed nanoparticles generated is proportional to the exposure time, t. The Pt concentration is also the same in the reactions (Pt/SnP=4000), so the diameter of the nanodendrite is related to the cube root of the initial Pt concentration divided by the number of seed nanoparticles as discussed above. In other words, the nanostructure diameter is expected to be proportional to the cube root of the initial Pt concentration divided by the exposure time (number of seeds), i.e., $([Pt]_0/t)^{1/3}$. Obviously this relationship cannot hold for exposure times longer than 3 minutes (short inverse exposure times), because the reaction mixture turns black and the metalloporphyrins no longer receive light. Similarly, for short exposure times (long inverse exposure times), the size is dominated by the spontaneous formation of seeds by slow chemical reduction. Nonetheless, between these extremes a linear relationship is observed. As expected, for the shortest illumination times, slow spontaneous formation of seeds competes with the photocatalytic process, leading to a broad size distribution (as shown by the horizontal bars in the plot in FIG. 7). When growth occurs totally in the dark the average size and size distribution are essentially the same as those seen when no photocatalyst is present.

Metalloporphyrin concentration and light exposure can also be used to control the size and size distribution of the circular nanosheets. For example, when SnOEP is included in DSPC liposomes, even at sub-micromolar concentrations, much smaller and more uniformly sized platinum nanosheets are formed. In summary, the light-dependent and metalloporphyrin-dependent size control demonstrated using this method are consistent with the proposed seeding-and-autocatalytic-growth mechanism put forward to explain the variable growth of the nanostructures obtained when photocatalyst is not present (FIGS. 2, 3, and 4).

A more detailed examination of the small nanostructures shown in FIG. 3(b) revealed crystallographic alignment within individual nanoparticles (FIG. 5), making the entire nanostructure one single crystal as expected for dendritic growth. The crystallinity of the nanodendrites is demonstrated by the Fourier transform of the atomic lattice fringing apparent in the image. The TEM image of a group of the small nanodendrites and the indexed convergent beam electron diffraction patterns of seven of the nanodendrites in the image showed that most of the three-dimensional nanodendrites are single crystals, as was the case for the two-dimensional nanosheets.

To our knowledge, this is the first example of this type of single-crystalline metallic nanodendrite. Consistent with their single-crystalline structure, the nanodendrites are stable in solution for at least three months. Even after taking the colloidal suspension to dryness and re-suspending the solid by mild sonication in the same solvent system, TEM images show that the structures of these nanodendrites are essentially unchanged.

To develop a more complete understanding of the seeding and dendritic growth processes, TEM samples obtained using SDS micelles were prepared at specific times during exposure to intense incandescent light. Washing and drying during the TEM sample preparation process effectively interrupts the reduction reaction giving a snapshot of the nanostructures present at the time the sample is prepared. The TEM images of these samples revealed the stages in the development of mature nanostructures like those in FIG. 5. At 30 seconds of illumination, individual particles were observed with diameters of about 6 nm and had density profiles suggestive of a thin spherical shell of platinum coating the micelle. The structures were unstable under the intense electron beam and popped open, forming several fragments. By 60 seconds, the Pt in these 6-nm shells apparently redistributed since one then observed only 3-4-nm particles that tended to aggregate with surfactant into randomly oriented groupings forming a ragged disk. This structure was likely an artifact of drying with surfactant present during the sample preparation. By an illumination time of 90 seconds, the original seed particles had begun to grow crystallographically aligned buds (branches), and the aggregates of seed nanoparticles had partially broken up as a consequence. At 3 minutes, the initial seed nanoparticles had sprouted several additional crystallographically aligned buds, and formation of these immature nanostructures had largely broken up the seed nanoparticle aggregates. By 10 minutes, the growing nanostructures contained most of their full complement of branches, and at 30 minutes and 1 hour, the mature nanostructures were observed.

The 6-nm shell-like structures seen at the earliest times suggest that the SDS micelles are serving a templating role as in the case of the liposomes for the circular nanosheets. Scanning TEM HAADF images of the mature photocatalytically seeded nanodendrites show that many of them have z-density profiles with a dip in the center. This result is consistent with these nanostructures lacking a metallic interior and possibly containing a surfactant micelle. We note, however, that seeding with Pt nanoparticles as opposed to using a photocatalyst molecule in the micelle produces essentially indistinguishable nanodendrites. This does not rule out a templating role for the micelles as the added nanoparticle might attach itself to the surface of a micelle, and then branching during the autocatalytic growth phase could coat the micelle to produce the observed nanostructure. In this regard, it is worth noting that the nanostructures formed at surfactant concentrations (1 mM) well below the nominal critical micellar concentration (CMC) of SDS (~8 mM) are identical to those formed at concentrations above the nominal CMC. However, because of the marked (50 to 200 fold) decrease in the CMC in the presence of porphyrins, micelles likely still exist to act as templates. Even where a templating role seems to be readily apparent, for example, for the liposomes in the formation of dendritic nanosheets, it is not always clear how this effect occurs. For example, the sheets could be formed on the surface, in the bilayer or between liposomes. In summary, these results suggest that surfactant must be present to form these nanostructures.

The surfactant is almost certainly involved in interfacially directing the dendritic growth of the three-dimensional nanostructures. In this regard, if pyridine, which interacts strongly with the platinum surface, is added to the Brij-35 reaction mixture in small amounts, nondendritic nanoparticles instead of 3-dimensional nanodendrites are formed. This is consistent with the pyridine effectively interrupting interfacial interactions of platinum with the surfactant. Above the nominal CMC, the metal surface of the growing Pt dendrite may becomes fully coated with a bilayer of surfactant. The oxidation of ascorbic acid and addition of platinum metal to the growing dendrite may then occur at the metal surface beneath this protective surfactant bilayer. Accretion of additional surfactant from solution onto the growing platinum surface protects the embryonic nanostructure. Below the nominal CMC, there is not enough surfactant to form a bilayer, but the platinum surface may nevertheless be covered with surfactant molecules. The fact that nanodendrites form even below the nominal CMC may indicate that the exact molecular structure of the surfactant layer is not critical for directing dendritic growth; this is consistent with the fact that surfactants with both negative (SDS) and neutral (Brij-35) head groups (FIG. 1) are equally capable of producing the three-dimensional dendritic nanostructures. It is also possible that ascorbic acid or its oxidation product may play some role in interfacially directing the dendritic growth. The importance of the interfacially directed growth process is supported by experiments in which pyridine, which interacts strongly with the platinum surface, is added to the Brij-35 reaction mixture in small amounts. In this case, nondendritic nanoparticles instead of the three-dimensional nanodendrites are formed, consistent with pyridine effectively interrupting the interfacial interactions of platinum with the surfactant.

A reasonable mechanism by which the surfactant layer might give dendritic growth is by controlling diffusion of reactants to the platinum surface. It is possible that diffusion of Pt complex and ascorbic acid into the approximately 1-nm wide surfactant-filled crevices between the arms of the three-dimensional dendrites is slower than the diffusion to the nanostructure extremities. This differential diffusion rate results in dendritic growth in a "rich gets richer" scenario. Note that at pH 3, ascorbic acid is fully protonated and neutral so it can easily diffuse through the surfactant layer. Similarly, the predominant $Pt(Cl)_2(H_2O)_2$ complex is also neutral and can easily diffuse across neutral and charged surfactant layers. In the case of the two-dimensional dendritic nanostructures, diffusion may be limited by the nanosheet being sandwiched between two liposomes, so that nutrients can only diffuse to the edge of the nanosheet.

Regardless of the exact organization of the metal and surfactant molecules, the photocatalytically active metalloporphyrin molecule probably remains associated with surfactant in the nanostructure that it nucleated. Colloidal platinum is a well-known catalyst for $H_2$ evolution from water in artificial photosynthesis systems. The dendritic Pt nanostructures, as made by the method of this invention, and the associated metalloporphyrin photocatalyst are able to generate $H_2$ in the presence of light and an electron donor. This $H_2$ photosynthetic chemistry is similar to the reaction mechanism described above for $Pt^{2+}$ reduction, except that $SnP^-$ provides electrons to $H^+$ at the Pt metal surface to produce hydrogen. Hydrogen evolution has been demonstrated with the dendritic nanoparticles made by the method of this invention. The reaction mixture containing the (12-nm) three-dimensional platinum dendrites and associated metalloporphyrin photocatalyst (as shown in FIG. 5) was irradiated with room light in the presence of ascorbic acid. After two months, the head-space of the sealed reaction vessel was analyzed by gas chromatography, and the presence of hydrogen was confirmed (~30% by volume). Two interesting aspects of this catalytic reaction are that $H_2$ evolution is observed even in the presence of the surfactant coating, and that the metalloporphyrin delivers its strongly reducing electrons directly to protons at the Pt surface without the aid of a relay molecule such as methylviologen, as has been required in some previous methods for Pt-based hydrogen evolution from water.

The nanodendrite-surfactant assemblies can exhibit a seemingly relatively poor light-harvesting ability because of the low concentration of the light-absorbing porphyrin per nanodendrite and the opacity of the colloidal solution. To address these deficiencies in one embodiment, water-soluble SnUroP (FIG. 1) was added to an ascorbic acid solution containing only a small amount of the nanodendrite mixture. The nanodendrites produced in these reactions are similar to those shown in the TEM image of FIG. 3(b). The volume of the liquid sample in the vessel was 2.5 mL. The reaction vessel consisted of a 6-inch round bottom Pyrex tube 0.75 inches in diameter that was sealed with a rubber septum. The reaction vessel was irradiated with a tungsten light source (800 nmol-$cm^{-2}$-$s^{-1}$ at the vessel). Primarily light with wavelengths in the region of the Soret band of the porphyrin is absorbed and contributes to the photoreaction. Samples were removed periodically for analysis. All reactions were run under an argon atmosphere.

Gas chromatography (GC) was used to quantify the $H_2$ gas produced photocatalytically by the platinum nanostructures. The GC instrument was calibrated immediately before the measurements by adding known amounts of $H_2$ to a control reaction mixture. All gas samples (typically 100 μL) were extracted from the void volume of reaction vessel and were manually injected with a syringe onto a 100/120 Carbosieve SII column (10 feet length, ⅛ inch width) and carried by argon at a constant flow rate of 100 $cm^3$-$min^{-1}$ to a thermal conductivity detector operating at 110° C. The retention time for hydrogen was about 1.4 minutes.

Figure 10:
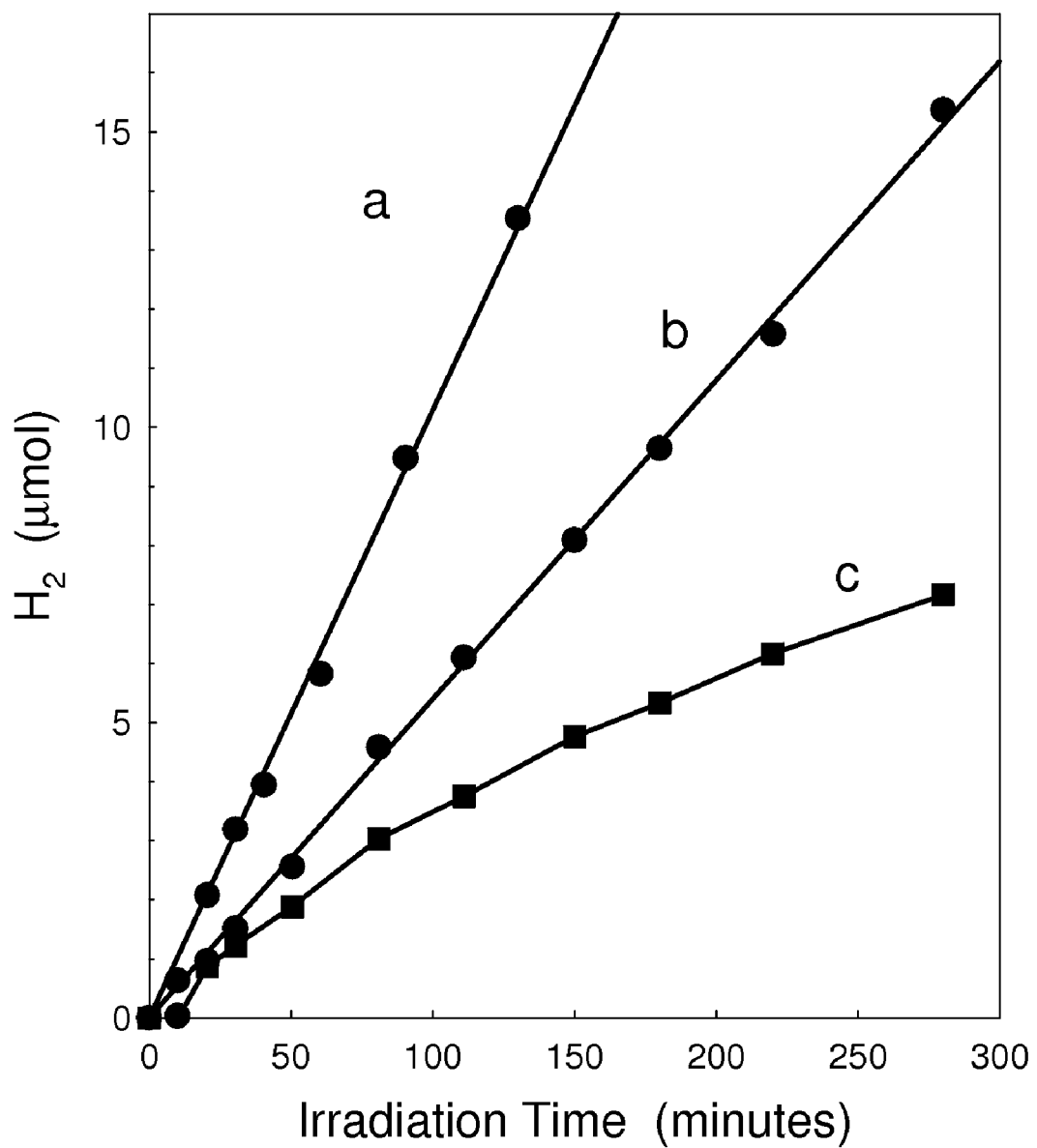
FIG. 10 illustrates the generation of hydrogen from water using the nanostructures of this invention.

Photocatalytic reduction of water to hydrogen was performed using platinum nanoassemblies, composed of platinum nanocrystals, surfactant, and SnOEP, with added Sn(IV) uroporphyrin I (80 μM). As shown in FIG. 10, hydrogen evolution increases linearly for hours with turnover rates as high as 390 $h^{-1}$ (mole $H_2$/mole atomic Pt). The Pt nanoassemblies were diluted into an ascorbic acid (ED) solution containing the Sn uroporphyrin for the measurement. Water was reduced at rates as high as 6 μmol-$hr^{-1}$ ($H_2$ turnover rate of 33 $hr^{-1}$ in terms of Sn uroporphyrin) by electrons from the Sn uroporphyrin anions supplied to the surface of the Pt-nanoparticle catalyst. White light intensity was 800 nmol-$cm^{-2}$-$s^{-1}$, but little of the light was absorbed except in the region of the Soret band of the porphyrin. Reaction conditions were: (a) low Pt (6.5 μM) and (b) high Pt (65 μM), both with the same ascorbic acid concentration (0.2 M); and (c) high Pt concentration with low ascorbic acid concentration (60 mM). $H_2$ turnover rates in terms of atomic Pt were for (a) 390 $hr^{-1}$, (b) 20 $hr^{-1}$, and (c) 14 $hr^{-1}$. $H_2$ evolution was greatly accelerated, consistent with increased light flux and the additional light harvesting provided by the SnUroP. Dilution of the nanodendrites may have also altered the surfactant coating and accelerated $H_2$ evolution.

As described above, seeding and autocatalytic growth by reduction of Pt salts in the presence of surfactants leads to unique two- and three-dimensional platinum nanodendrites. The platinum dendrites are formed by interfacially directed growth and restricted access of nutrients due to the surfactant on the surface of the growing nanostructure. In the case of large liposomes, templating by the surfactant results in sheet-like nanodendrites or foam-like nanosheets of platinum. The unique surfactant-templated platinum growth demonstrated by these two-dimensional dendrites presents the possibility of making other new metal nanostructures using different surfactant phases and other materials as templates. Such porous platinum nanomaterials prepared by this method have potential applications in catalysis, electronics, sensors, and magnetic devices.

The photocatalytic seeding approach provides a new in situ method of varying the concentration of seed nanoparticles and thus the final size of the nanostructures. This method presents new opportunities for controlling seeding rates by varying photocatalyst concentration and light intensity. Importantly, it also offers the potential for controlling the synthesis of platinum nanostructures by lithographic techniques, i.e., controlling the location at which nanostructures are grown. Besides lithographic control, the location might also be controlled by pre-positioning and immobilizing the photocatalyst molecules in a desired pattern. For the 3-D nanodendrites, the particular micelles that contain a porphyrin molecule are those that can lead to formation of a high density of seed nanoparticles within a short period of time. This leads to greater uniformity of size in the final ensemble of dendritic nanoparticles made by this method. For the two-dimensional dendritic nanosheets, the location at which growth occurs can be controlled by the location of the porphyrin photocatalyst in the templating surfactant to produce a final ensemble of dendritic nanosheets that are highly uniform in size.

It should be apparent that there are many modifications possible with this invention, as long as the concept of combining an aqueous solution of a surfactant, a metal ion and an electron donor species to form a reaction solution, and reducing the metal ion to form a dendritic metal nanostructure on a surfactant structure template is followed. It is intended that the scope of the invention be defined by the appended claims.

The invention claimed is:

1. A dendritic metal nanostructure comprising a metal dendrite and a surface-associated surfactant, wherein the metal dendrite comprises a two-dimensional sheet of metal branches.

2. The dendritic metal nanostructure of claim 1, wherein the two-dimensional sheet of metal branches has a substantially circular shape.

3. The dendritic metal nanostructure of claim 1, wherein a plurality of two-dimensional sheets of metal branches are combined to form a foam.

4. The dendritic metal nanostructure of claim 3, wherein the foam is a foam-like ball.

5. The dendritic metal nanostructure of claim 1, wherein a metal of the metal dendrite is selected from the group consisting of Pt, Pd, Au, Ag, Ir, Ru, and Rh.

6. The dendritic metal nanostructure of claim 1, wherein the surface-associated surfactant is selected from the group consisting of sodium dodecyl sulfate, polyoxyethylene lauryl ether, 1,2-diocatadecanoyl-sn-glycero-3-phosphocholine, cholesterol, and an ethylene oxide/propylene oxide block copolymer.

7. A dendritic metal nanostructure comprising a metal dendrite and a surface-associated surfactant, wherein the surface associated surfactant comprises a surfactant and a photocatalyst.

8. The dendritic metal nanostructure of claim 7, wherein the photocatalyst is selected from a group consisting of a metalloporphyrin, a metallochlorin, a metallochlorophyll, a metal polypyrrole complex, a metal polypyridine complex, and a metal phenanthroline complex.

9. A dendritic metal nanostructure comprising a two-dimensional sheet of branches comprising a metal.

10. The dendritic metal nanostructure of claim 9, wherein a thickness of the two-dimensional sheet is less than or equal to approximately 10 nm.

11. The dendritic metal nanostructure of claim 9, wherein the two-dimensional sheet has a substantially circular shape.

12. The dendritic metal nanostructure of claim 11, wherein the branches of the dendritic metal nanostructure have substantially a uniform thickness except at tips of the branches.

13. The dendritic metal nanostructure of claim 9, wherein the dendritic metal nanostructure comprises a single crystal of the metal.

14. The dendritic metal nanostructure of claim 9, further comprising a plurality of two-dimensional sheets combined to form a foam.

15. The dendritic metal nanostructure of claim 14, wherein the foam is a foam-like ball.

16. The dendritic metal nanostructure of claim 9, wherein the metal is selected from the group consisting of Pt, Pd, Au, Ag, Ir, Ru, and Rh.

17. The dendritic metal nanostructure of claim 9, further comprising a surface-associated surfactant.

18. A dendritic metal nanostructure comprising a non-metallic interior comprising a surfactant and a metallic exterior comprising dendritic metal extending substantially radiately outward from an interface between the non-metallic interior and the metallic exterior.

* * * * *